Dec. 28, 1965     M. J. IOVENKO     3,226,285
MODIFIED PLASTIC TUBING
Filed Jan. 4, 1962     6 Sheets-Sheet 3
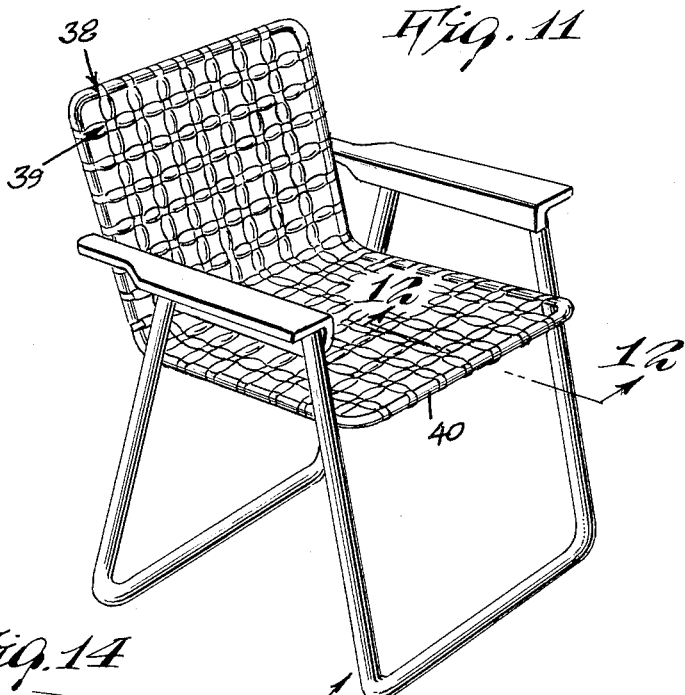
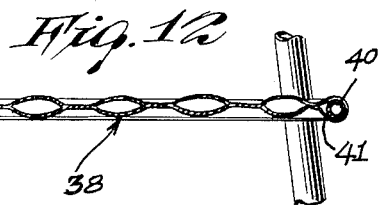
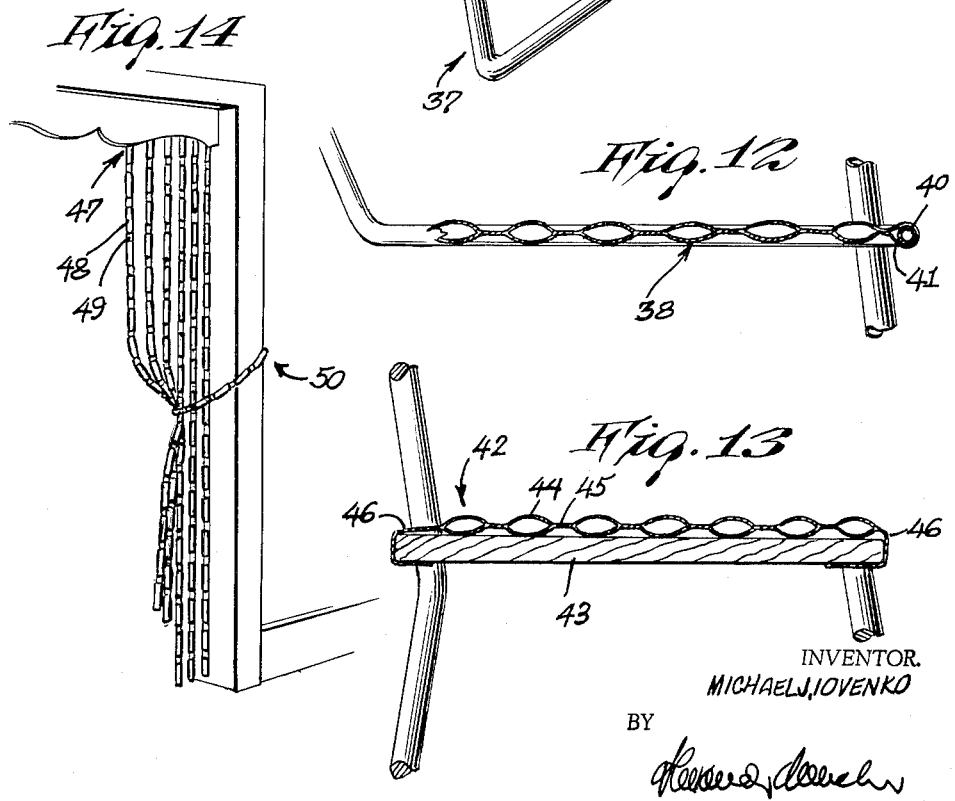
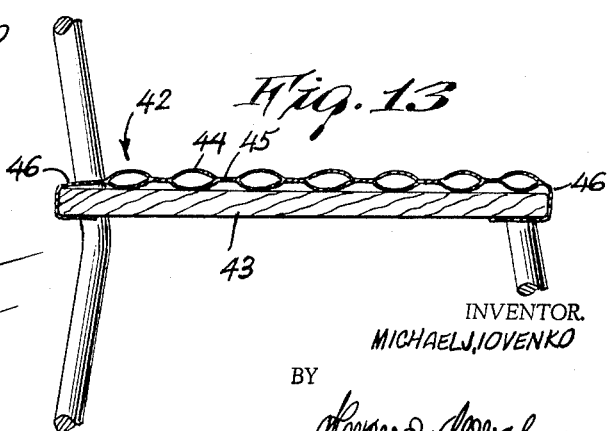
INVENTOR.
MICHAEL J. IOVENKO
BY
ATTORNEY

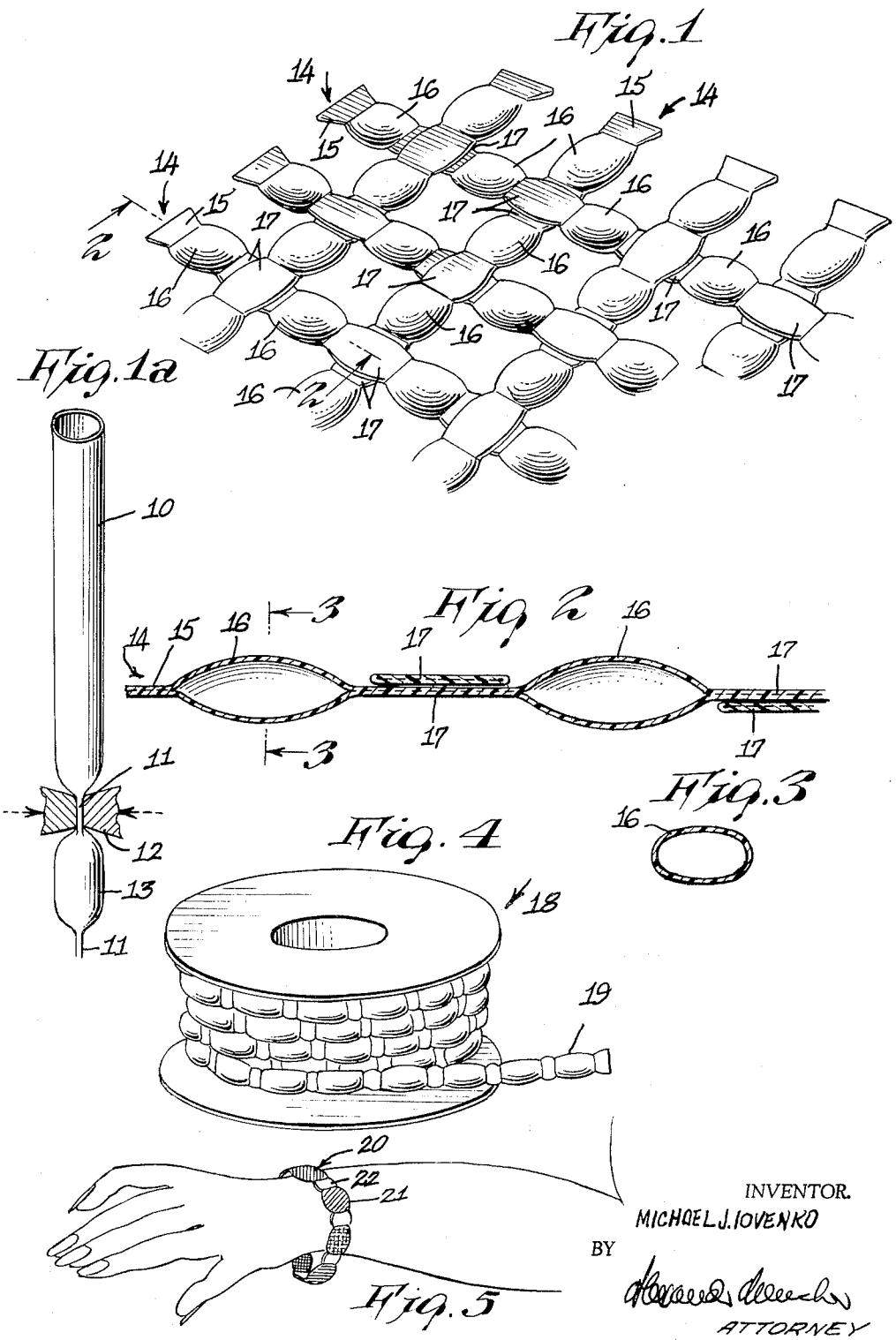

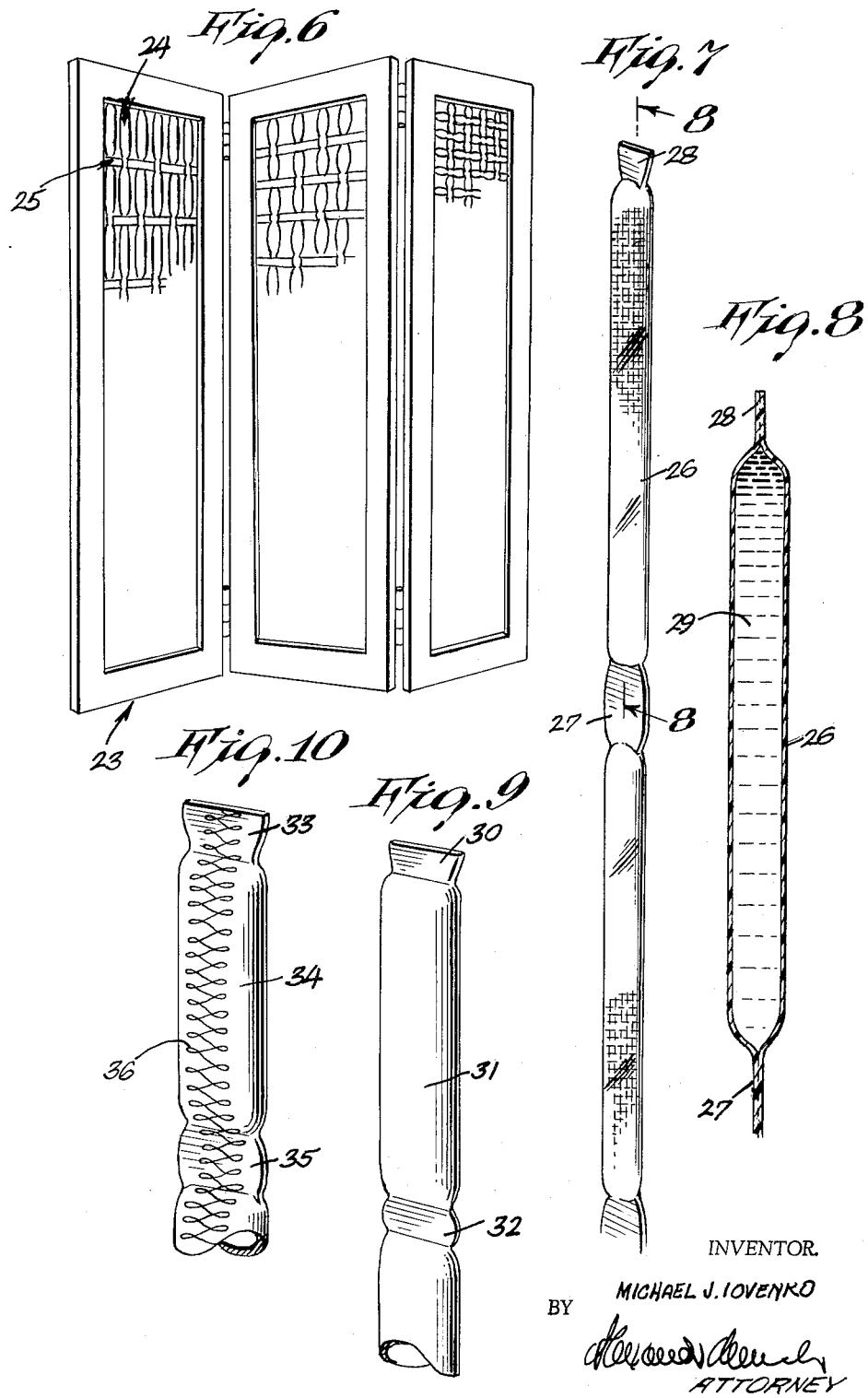

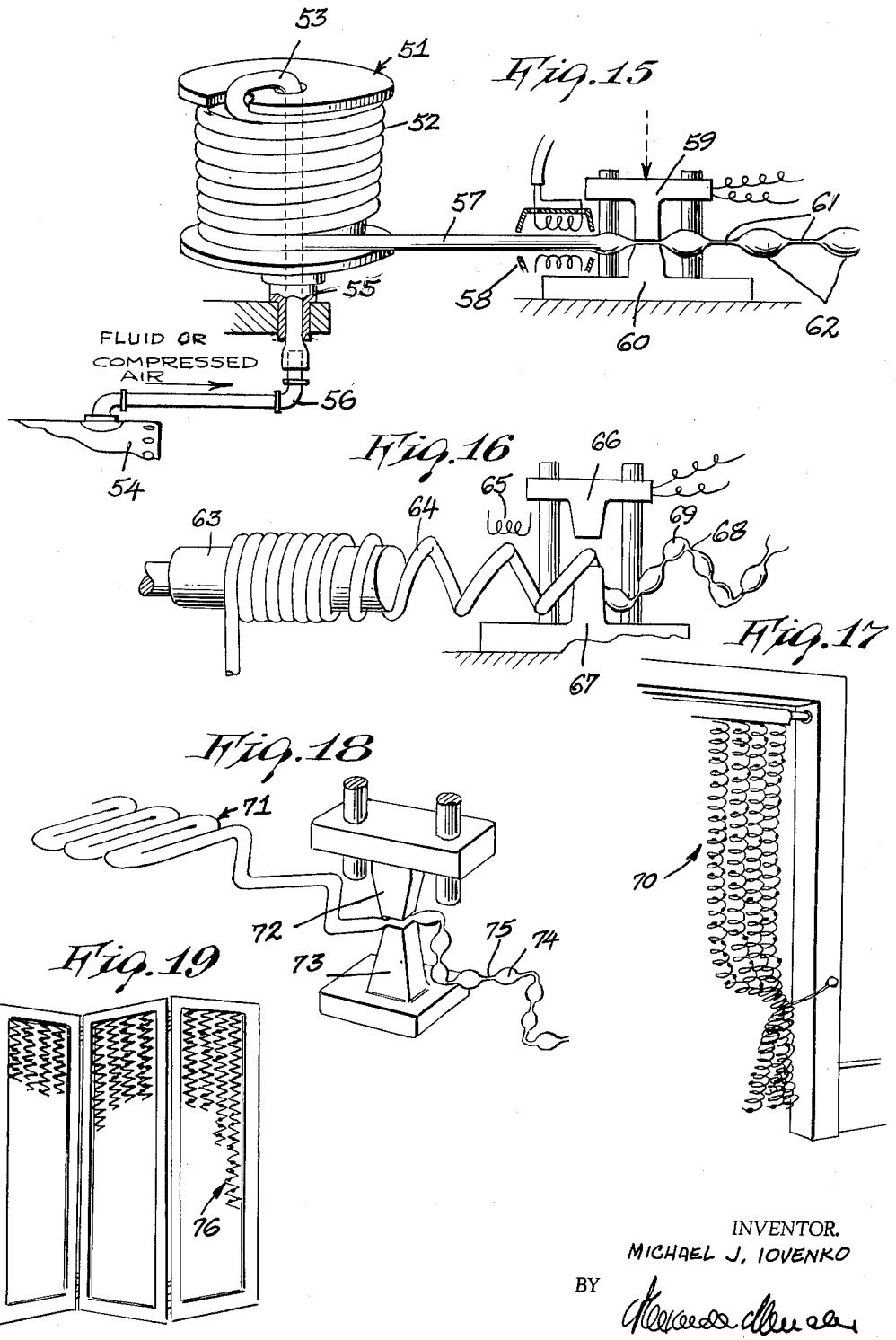

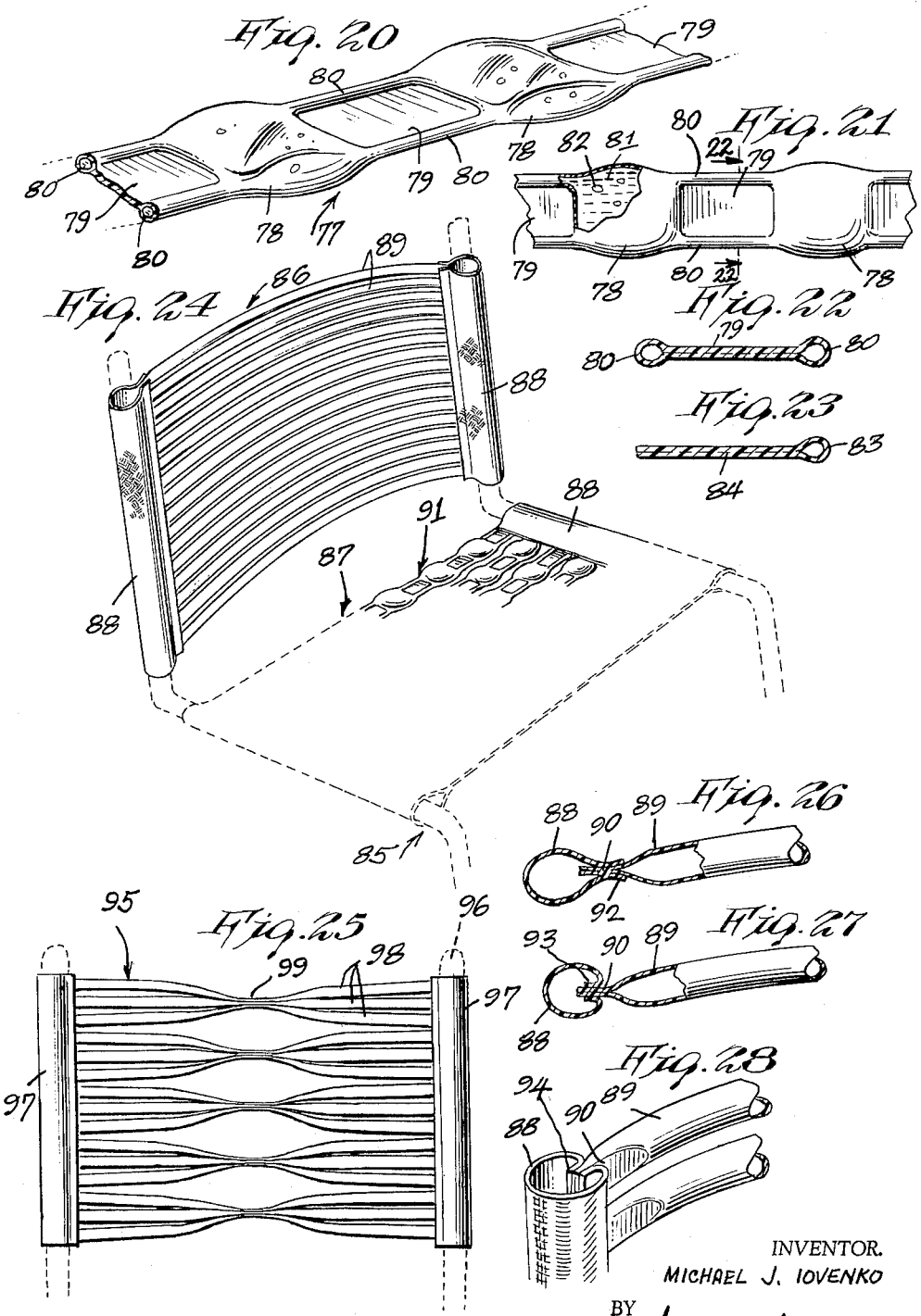

Dec. 28, 1965    M. J. IOVENKO    3,226,285
MODIFIED PLASTIC TUBING
Filed Jan. 4, 1962    6 Sheets-Sheet 6
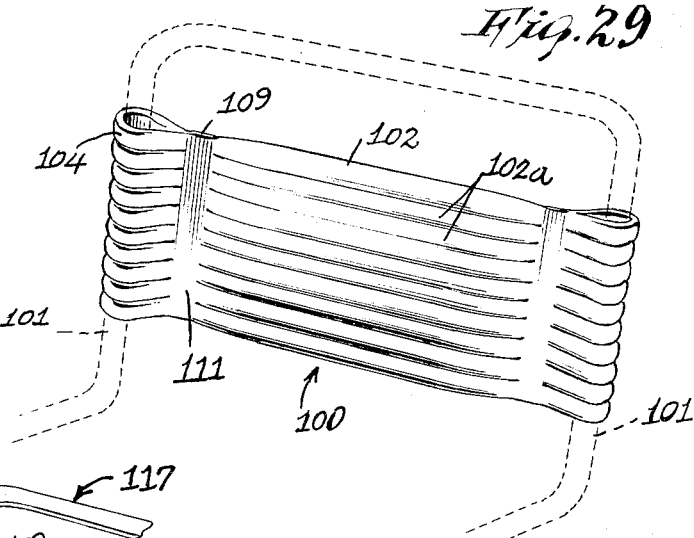
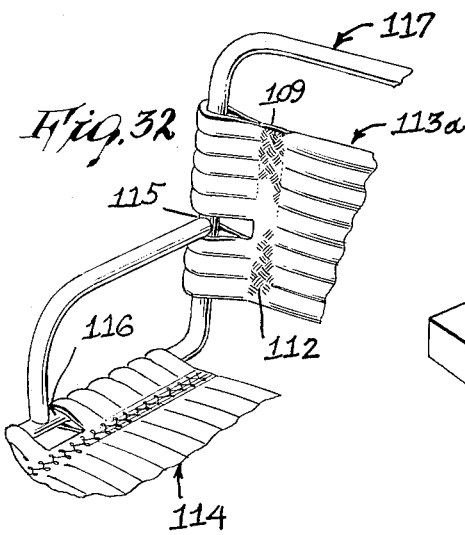
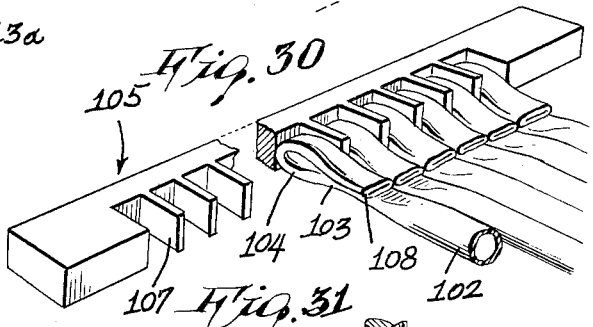
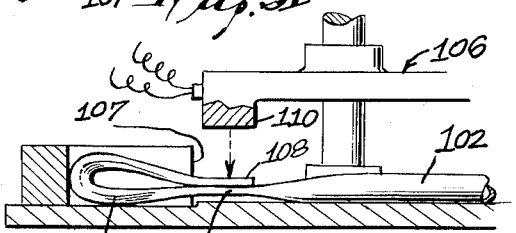
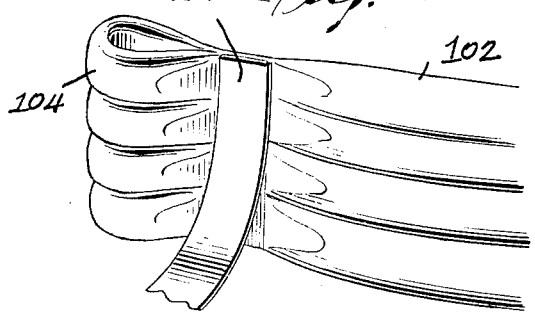
INVENTOR.
MICHAEL J. IOVENKO
BY
ATTORNEY United States Patent Office 3,226,285
Patented Dec. 28, 1965

3,226,285
MODIFIED PLASTIC TUBING
Michael J. Iovenko, New York, N.Y., assignor of fifty percent to Alexander Mencher, Forest Hills, N.Y.
Filed Jan. 4, 1962, Ser. No. 165,062
4 Claims. (Cl. 161—72)

This invention relates generally to tubular products, but more specifically to plastic tubing formed or molded from thermoplastics including styrene polymers and copolymers, acrylics, cellulosics, polyolefins (polyethylene and polypropylene), vinyls, nylons, acetals, chlorinated polyether, polycarbonates, some polyurethanes, and fluorocarbons.

Specifically, the invention embraces modifications of such tubing by providing flattened and heat-sealed sections and other sections therealong having entrapped fluid and/or gaseous contents under pressure or otherwise; the purposes of such modifications being to serve as functional and decorative strands per se or in the form of assemblies and interlaced or interwoven units of such strands.

For particular functions, it is preferred to have such modified strands fabricated from yieldable and flexible tubing such as is formed from the polyolefins and the vinyls.

Broad objects of the invention are to provide methods for modifying plastic tubing and resultant product therefrom for scientific, industrial, commercial and household embodiments and applications.

Other objects reside in the conversion of plastic tubing efficiently and economically for utilization as strands, weaves and assemblies, for furniture and household panelling, for fencing and other uses.

These objects and other ends of the invention will hereinafter appear in the progress of the disclosure and as pointed out in the appended claims.

Accompanying this specification are drawings showing various forms of the invention wherein:

FIGURE 1 is a fragmentary view in perspective showing an assembly or weave of strands of the modified plastic tubing;

FIGURE 1a is an enlarged view in perspective, partly in section, showing one manner of entrapment of fluid and/or gaseous contents in the formation of a modified strand from plastic tubing;

FIGURE 2 is an enlarged and sectional view of FIG. 1 across the plane 2—2 thereof;

FIGURE 3 is a sectional view of FIG. 2 across the plane 3—3 thereof;

FIGURE 4 is a view in perspective showing a run of modified plastic tubing wound on a spool or drum;

FIGURE 5 is a view in perspective of an application of a piece of modified tubing in the form of a handbracelet;

FIGURE 6 is a view in perspective of a foldable screen showing panelling from an interlacing or weave of modified strands;

FIGURE 7 is a view in perspective showing a length of modified plastic tubing with collapsed and entrapped sections filled with a colored fluid;

FIGURE 8 is an enlarged sectional view of FIG. 7 across the plane 8—8 thereof;

FIGURE 9 is a view in perspective showing a length of another form of modified strand with collapsed and entrapped sections filled with air or other gas;

FIGURE 10 is a view in perspective similar to the product shown in FIG. 9 but showing decoration on the outer walls;

FIGURE 11 is a view in perspective showing a chair having a weave of the modified strands secured thereto;

FIGURE 12 is a fragmentary and enlarged sectional view of FIG. 11 across the plane 12—12 thereof;

FIGURE 13 is an enlarged fragmentary view partly in section showing a weave with specific means of application to a chair seat;

FIGURE 14 is a fragmentary view in perspective showing portieres formed from strands of the invention;

FIGURE 15 is a diagrammatic view showing apparatus and steps in one method for modification of plastic tubing in accordance with the invention;

FIGURE 16 is a diagrammatic view showing apparatus and steps in another method for modification of plastic tubing;

FIGURE 17 is a partial view in perspective showing one use of modified strands formed from the assembly shown in FIG. 16 as portieres;

FIGURE 18 is a diagrammatic view showing apparatus and steps in another method for modification of plastic tubing;

FIGURE 19 is a view in perspective showing a foldable screen utilizing assembled strands as formed by the method shown in FIG. 18;

FIGURE 20 is a perspective view of a length of modified plastic tubing having collapsed and fluid entrapped sections and communication between entrapped sections for scientific or decorative purposes;

FIGURE 21 is a reduced top view of a strand similar to that of FIG. 20 with parts broken away;

FIGURE 22 is an enlarged sectional view of FIG. 21 across the plane 22—22;

FIGURE 23 is a view similar to FIG. 22 except that the communication between entrapped sections is at one edge of the intermediate collapsed section;

FIGURE 24 is a view in perspective showing a chair in phantom and a weave and an assembly of modified strands provided with attached sleeves for engagement with chair frame pieces;

FIGURE 25 is a view in elevation showing another assembly of modified strands differing from that shown in FIG. 24 and as applied to a chair;

FIGURES 26, 27, and 28 are fragmentary views partly in section and show sleeve means variously and heat-sealingly engaging the ends of assembled modified strands shown in FIGS. 24 and 25;

FIGURE 29 is a fragmentary perspective showing another assembly of modified strands for application to a chair as shown in phantom;

FIGURE 30 is a view in perspective showing one type of jig for loop formation of a plurality of modified strands aligned therealong;

FIGURE 31 is a fragmentary sectional view showing a sealing tool in cooperation with the jig of FIG. 30 toward the sealing and interengagement of the engaging loops shown in FIG. 29;

FIGURE 32 is a view in perspective showing a modification of the loop formation shown in FIG. 29 and as applied to a chair; and FIGURE 33 is a fragmentary view in perspective showing a modification of the sealing and interengagement of loop formations as shown in FIGS. 29 and 32.

In accordance with the invention and the preferred forms shown, numeral 10 in FIG. 1a indicates an open end length of plastic tubing wherein collapsed or flattened and heat-sealed sections 11 cause entrapment within the intermediate section 13 of air. A sealing tool diagrammatically indicated by numeral 12 is utilized for collapsing and heat-sealing the walls of the tubing 10.

The stock plastic tubing obtained by various known molding procedures and as shown in FIG. 15 is preferably provided with fluid or compressed gas such as air for purposes of filling or pressure inflation prior to modification into collapsed and heat-sealed sections and entrapped sections.

As best seen in FIGS. 1–5, modified plastic strands generally indicated by the numeral 14 are each provided with flattened and heat-sealed sections alternating with filled or expanded fluid or gas sections. The weave formed from the interlacing of such strands is as shown in FIG. 1 with the ends of the strands 14 being in flattened and heat-sealed form 15 while the alternating entrapped sections are indicated by numeral 16 and the flattened and heat-sealed sections are indicated by numeral 17. The weave as shown on FIG. 1 is accomplished preferably by bringing the flats into super-imposition.

Extensive lengths of modified plastic tubing or strand may be wound on the drum or spool indicated by numeral 18 with the strand being indicated by numeral 19. A portion of the strand may be formed into a bracelet as shown in FIG. 5 and indicated generally by numeral 20, with entrapped fluid sections being indicated by numeral 21 and flattened and heat-sealed sections by numeral 22. The plastic tubing may be colored, or the fluid forming the contents or pressurizing medium of the entrapped sections may be colored.

An interlacing or weave of the modified strands serves as a panel section for a folding screen indicated generally by numeral 23 shown in FIG. 6. Thus, intersecting strands 24 and 25 comprise the panel element, the ends of the strands being suitably secured to the screen frames such as by suitably engaging flattened and heat-sealed end sections. FIGS. 7 and 8 show a modified strand with entrapped colored fluid for filling or inflation in the extended sections such as 26 with the shorter and heat-sealed flats 27 alternating therewith, the ends of the strands being in flat and heat-sealed form as indicated by numeral 28 for purposes of affixation to the screen frames.

Variations of modified plastic strands are shown in FIGS. 9 and 10 wherein 30 indicates an end heat-sealed collapsed and flattened section for suitable affixation, 31 indicates an entrapped air or inflated section and 32 indicates the intermediate heat-sealed flattened section. The strand shown on FIG. 9 may be in decorative form as shown in FIG. 10 wherein the end flat as effected by collapsing and heat-sealing is indicated by numeral 33, adjacent entrapped portion by numeral 34, intermediate heat-sealed flat by numeral 35 and decorative element 36. Moreover in the strands of FIGS. 9 and 10 colored, opaque, transparent and translucent plastic tube stock may be used.

The modified strands from plastic tubing of the flexible resilient and elastic variety may assume the form of weave or interlacing for application to various types of furniture such as is shown in FIG. 11. Thus, a chair generally indicated by numeral 37 is provided with an interlacing of similar or dissimilar strands 38 and 39, the ends of each of the strands being in the form of loops 41 for effecting engagement wtih framework element 40 of the chair by conventional methods.

In the chair shown in FIG. 13 the weave or interlacing 42 is shown as applicable over and to superimpose a supporting surface such as 43 in contradistinction to the suspended weave shown in FIG. 11, the entrapped and flattened sections of the strands used being indicated by numerals 44 and 45 respectively. Each strand end may be in the form of a flat 46 which is capable of folding around the edge of the supporting seat 42 and affixed thereto by suitable nails (not shown) or other methods.

In the embodiment shown in FIG. 13, weave 43 affords a resilient cushioning effect afforded by the fluid or gas entrapped sections 44 while in the embodiment of FIG. 11 the suspended weave of strands 38 and 39 also afford a yieldable and resilient effect when in use.

Utilization of an assembly of modified strands is shown in FIG. 14 for use as a curtain or portieres. Here the strands generally indicated by numeral 47 may be filled with different colored fluids at the entrapped sections 48, the flats or collapsed and heat-sealed sections being indicated by numeral 49. A loop for the curtain or portieres is indicated generally by numeral 50 and may by formed of the modified strand material if desired.

One of the systems for modifying plastic tubing and as shown diagrammatically in FIG. 15 comprises the use of means for introducing gas or fluid into plastic tubing stock and thereafter collapsing and heat-sealing selective sections for entrapping such gas or fluid in intermediate sections. Thus, a drum 51 is provided with plastic tubing stock 52 wound thereon. At one free end 53 of tubing 52 fluid or compressed air or gas is introduced as from a source 54. End 53 of the wound tubing is suitably attached through a coupling 55 secured to the bottom of drum 51 for receiving fluid, air or other gas from the nozzle 56 of source 54. The leading end 57 of the tubing is drawable from the drum with the terminal closed (not shown) and passes first through a suitable heater 58 and then through heated dies 59 and 60 for collapsing and compression to form heat-sealed flat areas 61. Between the heat-sealed and flattened sections 61 are the fluid or gas entrapped sections 62. Flexibility and elasticity of stock 52 enables the medium entrapped sections to yield from resultant pressure development if present.

In FIG. 16 is shown another system of modifying plastic tubing. The medium filled stock is drawn off a cylinder 63 in helical form 64 whereupon selective portions are subjected to collapsing and heat-sealing. Thus, 64 is subjected first to a heating element 65 and then to the heated dies 66 and 67 for developing collapsed and heat-sealed sections 68 and entrapped sections 69. FIG. 17 shows usage of such modified strands in assembly form to serve as curtains or portieres 70.

In FIG. 18 is shown another system of modifying plastic tubing by withdrawing of the medium (fluid or gas) filled stock from another formation 71; then collapsing and heat-sealing portions as by dies 72 and 73 resulting in a strand having entrapped sections 74 and heat-sealed flattened sections 75. An assembly of such strands in the form of a panel 76 for a foldable screen is shown in FIG. 19.

Plastic tubing modified in accordance with the invention herein has broad structural and fabrication possibilities and application to industrial, commercial, household and other uses. Such modified strands having fluid or gas entrapped sections under pressure or otherwise between collapsed and heat-sealed sections afford resilient cushioning elements, tensile strength and application for design and scientific function.

As shown in FIG. 20, a length of modified strand generally indicated by numeral 77 has provision for constricted communication between alternate entrapped sections 78 between flattened and heat-sealed sections 79. The longitudinal edges of one or more of the flattened sections are provided with restricted channels 80 for communication of entrapped fluid 81 (or gas if gas filled) in sections 78. This type of communication permits the modified strand to accommodate currents when activated by heating effects, to cause expulsion of dissolved gases in fluids 81 as bubbles 82 when under heating or electrical effects and further permits the strand to "breathe" as when pressure is exerted on a portion and then removed.

The modified strand as described may be used in the formation of commercial signs and for scientific purposes, as an element for capacitance apparatus or for testing physical, chemical and electrical values. As shown in FIG. 23, the restricted communicating channel 83 is shown at only one edge of one or more flattened heat-sealed sections 84 whenever desirable.

Because of the extensive forms which the modified strands may assume and the heat-sealable characteristics of the plastic material involved, assemblies or weaves for panelling, upholstery and the like may be provided with various design configurations and various attaching means for mounting of such weaves.

As shown in FIG. 24, a chair frame represented in phantom and generally indicated by numeral 85 is provided with parallely arranged strand assemblies, numeral 86 generally representing a back rest and 87 representing a seat upholstery element. Each of the strand elements in assemblies 86 and 87 are provided with flattened and heat-sealed ends for suitable engagement with lateral sleeve elements 88. The individual strands of backrest 86 are comprised of elongated gas or fluid-trapped sections 89 between flattened and heat-sealed ends 90 while the individual strands generally indicated by numeral 91 of the seat element 87 may assume the form shown by numeral 77 in FIG. 20 with the end sections flattened and completely sealed (not shown).

Lateral sleeve elements 88 serve to integrate the strands of assemblies 86 and 87 by suitable attachment to the flattened and heat-sealed end sections. If such sleeves 88 are of heat-sealable plastic, then junction may be effected in the manners shown in FIG. 26–28 wherein the sleeve edges are indicated respectively by numerals 92, 93 and 94. Of course stitching or other means may be substituted as means for affixation for welding.

It should be noted that in applying panels such as 86 and 87 integrated by lateral sleeves 88 to frame rods of articles of furniture as by suitable sleeve insertion, the strand assembly between the sleeves may be subjected to heat for both expansion of the assembly to assume proper fit to the mounting rod and to mold or effect desired configuration. Upon cooling, the mounted assembly will contract for desired tightness of fit and permanent configuration.

In FIG. 25 is shown a modified strand assembly indicated by numeral 95 mounted on chair posts 96 (in phantom) by sleeves 97. Here the strands 98 are joined by heat-sealing intermediate the ends as at 99 and in groups of three to indicate the design possibilities.

The fabrication and/or integration of loop ends from the end flattened and heat-sealed sections of strands such as 89 may also serve as mounting elements instead of separate sleeves such as 88 and 97. Such alternation is best shown in FIGS. 29–33.

Thus, numeral 100 in FIG. 29 shows generally a parallel assembly of adjacent strands heat-sealed at the ends for loop formation for mounting such as on chair-frame rods indicated by numeral 101. Each of the strands is comprised of an elongated entrapped intermediate section 102 and end flattened and heat-sealed sections 103. One manner of effectuating a sleeve for the end sections 103 is illustrated by having said ends folded over into loop formation 104 as shown in FIGS. 30 and 31. This may be done practically by any type of suitable jig such as generally indicated by numeral 105 for positioning and alignment.

A heat-sealer generally indicated by numeral 106 may be provided to cooperate with jig 105 opposite the ends of jig teeth 107 for welding of the free loop ends 108 to the opposite and inner portions of the flattened heat sealed ends as at 109.

In the sealing operation, the sealing of loops 104 at the area of the sealer bar 110 may join the adjacent strands 102a for permanent or strippable integration, said area being indicated by numeral 111. The pressure sealer bar 110 may have a design on the face thereof for decorative purposes as indicated by numeral 112 in FIG. 32.

An independent heat-sealed plastic strip 113 may be superimposed over the folded end sections 103 before application of sealing bar 110 for affording a thicker welded area to add greater strength to the fabricated sleeve as described. The advantages of the sleeves described reside in the strength thereof since they are of four plies as shown in FIGS. 29 and 32 and of five plies as shown in FIG. 33. Of course, it is understood that each strand 102 may be individually mounted on chair-frame rods 101 through individually welded end loops 104.

FIG. 32 shows strand assemblies generally indicated by numeral 113a and 114 substantially similar to assembly 100 of FIG. 29 except for the showing of cut-outs 115 and 116 at chair-rod joints of frame generally indicated by numeral 117.

Thus has been described methods of modification of plastic tubing stock and utilization and fabrication of such modifications. The resultant strands individually and in assembly afford advantages of strength, long life, and application to scientific, industrial, commercial, household and other purposes as described.

It is understood that variations in shapes, sizes, design and assemblies of the modified strands as well as the material of the plastic tubing stock and minor changes in the processing steps may all be resorted to without departing from the spirit of the invention and the scope of the appended claims.

I claim:

1. A weave comprising intersecting individual strands formed from individual lengths of modified flexible, expandible and resilient thermoplastic tubing having fluid containing sections and flattened and heat-sealed sections, the intersections being at said flattened and heat-sealed sections.

2. Modified thermoplastic tubing comprising an individual strand formed therefrom having heat-sealed flattened sections, having a plurality of fluid-filled and fluid-entrapped intermediate sections, and having tubular means for fluid flow between said intermediate sections.

3. Modified thermoplastic tubing comprising an individual strand formed therefrom having heat-sealed flattened sections, having a plurality of fluid-filled and fluid-entrapped intermediate sections, and having tubular means integral with said flattened sections for fluid flow between said intermediate sections.

4. A weave comprising intersecting individual strands formed from individual lengths of modified flexible, expandible and resilient thermoplastic tubing, each having fluid-containing sections and flattened and heat-sealed sections, said latter sections having integral tubular means for fluid flow between said fluid-containing sections, the intersections being at said flattened and heat-sealed sections.

References Cited by the Examiner

UNITED STATES PATENTS

| | | | |
|---|---|---|---|
| 2,530,400 | 11/1950 | Rado | 53—284 XR |
| 2,715,231 | 8/1955 | Marston | 5—349 XR |
| 2,936,816 | 5/1960 | Lang | 156—198 XR |
| 2,978,006 | 4/1961 | Clemens | 156—210 |
| 3,000,432 | 9/1961 | Olken | 154—46 |
| 3,011,930 | 12/1961 | Dworak | 156—145 XR |
| 3,026,231 | 3/1962 | Chavannes | 156—205 |

FOREIGN PATENTS

| | | |
|---|---|---|
| 92,297 | 10/1959 | Netherlands. |
| 861,447 | 2/1961 | Great Britain. |

ALEXANDER WYMAN, *Primary Examiner.*

EARL M. BERGERT, *Examiner.*